(12) United States Patent
Maier

(10) Patent No.: US 7,095,887 B2
(45) Date of Patent: Aug. 22, 2006

(54) METHOD OF REGISTERING IMAGE INFORMATION

(76) Inventor: Thomas Maier, Heinzenstr. 13, Aachen (DE) 52062

( * ) Notice: Subject to any disclaimer, the term of this patent is extended or adjusted under 35 U.S.C. 154(b) by 420 days.

(21) Appl. No.: 09/987,020

(22) Filed: Nov. 13, 2001

(65) Prior Publication Data

US 2002/0057834 A1  May 16, 2002

(30) Foreign Application Priority Data

Nov. 12, 2000  (DE) ............... 100 55 837

(51) Int. Cl.
*G06K 9/00* (2006.01)
*G09G 5/02* (2006.01)

(52) U.S. Cl. ..................... 382/162; 345/591

(58) Field of Classification Search ................ 382/132, 382/162, 167, 293; 345/590, 591, 603; 358/518, 358/523
See application file for complete search history.

(56) References Cited

U.S. PATENT DOCUMENTS 5,748,342 A * 5/1998 Usami ................. 358/500
6,023,527 A * 2/2000 Narahara ............. 382/167

* cited by examiner

*Primary Examiner*—Vikkram Bali
*Assistant Examiner*—Colin LaRose
(74) *Attorney, Agent, or Firm*—Banner & Witcoff, Ltd.

(57) ABSTRACT

A method of adapting image information to the perceptive capacity of the human eye, having the following steps: (a) displaying lightness values and colorimetric values or chromaticity steps from an original image as a group of points in an initial color space; (b) transferring the group of points into a physiological substantially equal-spaced perceived color space while maintaining the geometry of the group of points within the limits of an output color space projected into the perceived color space; (c) transforming the group of clouds from the perceived color space into the output color space by using the transformation equations existing between the perceived color space and the output color space; and/or (d) displaying the image with lightness values and colorimetric values or chromaticity steps in accordance with the points contained in the output color space.

20 Claims, 2 Drawing Sheets

METHOD OF REGISTERING IMAGE INFORMATION

FIELD AND BACKGROUND OF THE INVENTION

The invention relates to a method of adapting image information to the perceptive capacity of the human eye.

Color is a visible sensation, which is triggered by electromagnetic radiation and is conveyed by the eye. Only in the brain does the conversion take place between the energy of the color stimulus coming from outside and the actual color sensation. Color is therefore not an objective physical property of a body or a light source but a subjective perception. In this case, the perception of lightness steps and color steps depends to a great extend on the respective lightness and color or color saturation. For example, it is possible that different color or lightness steps, which may be detected reliably in terms of the frequency and amplitude of the electromagnetic radiation in the visible range, are to some extent not perceived at all, or are perceived only weakly or in distorted form.

In order to describe colors, color spaces based on different principles are used. For example, there is the RGB color space which describes an additive color system, the HSB color space based on the latter, the CMYK color space, which describes a subtractive color system, or the CIE standard color space which describes all the colors which can be perceived by the human eye. The common factor in all these color spaces is that the color difference between colors which in each case are at the same distance from one another within the color spaces are perceived differently in physiological terms, for the reason mentioned above.

By contrast, there are various models for transforming color spaces into perceived color spaces, in which the color difference corresponds to the physiologically perceived color difference. For example, the CIE-L*a*b* system is based on a mathematical transformation of the CIE standard color space.

The subjectively different perception of color differences, in particular in the visual evaluation of image information, results in a considerable problem. For example, in the original of an X-ray image, there is contained a large amount of measurable image information, whose display in various closely adjacent gray steps cannot be distinguished or can barely be distinguished by the human eye. This information therefore cannot be assessed visually at all, or only poorly.

For the improved evaluation of radiological image data, in particular, DE 4437467 C1 proposes emphasizing linear structures more clearly, by individual image points being emphasized by the image signal values from these image points being amplified as a function of the image signal values from adjacent image points. If the contrast between mutually spaced image points is high, this contrast is enhanced. If it is low, no enhancement occurs. The method is therefore not suitable to make it possible for image points located close beside one another and having very similar colorimetric values to be distinguished better from one another. A further disadvantage is that the image information is distorted and, as a result, falsified. Finally, the mathematical method which necessarily has to be used is complicated.

BRIEF SUMMARY OF THE INVENTION

The present invention is based on the object of providing a method of the type mentioned at the beginning with which all the image information which can be registered by measurement is displayed in such a way that it is visually perceptible and therefore assessable.

This object is achieved by a method having the following steps:
1) displaying lightness values and colorimetric values or chromaticity steps from an original image as a group of points in an initial color space;
2) transferring the group of points into a physiologically substantially equal-spaced perceived color space while maintaining the geometry of the group of points within the limits of an output color space projected into the perceived color space;
3) transforming the group of points from the perceived color space into the output color space by using the transformation equations existing between the perceived color space and the output color space;
4) displaying the image with lightness values and colorimetric values or chromaticity steps in accordance with the points contained in the output color space.

In the following text, color space is understood to mean any color space which is not equally spaced as judged by perception, such as the RGB color space, the CMYK color space, the HSI color space, the CIE standard color space or a color space comparable with these. In these color spaces, the three-dimensional distance between two colors does not necessarily correspond to the physiologically perceived color difference.

Perceived color space is to be understood as any space for color representation in which the three-dimensional distances between the colors substantially correspond to the color difference that can be perceived by the human eye.

The output color space is the color space on whose color determination the color of an image point in the displayed image is based. The output color space can be, but does not have to be, the same as the initial color space.

If the group of points is transferred from the initial color space into the perceived color space while maintaining its geometry, it can be used in any region within the limits of the output space projected into the perceived color space. At the same time, it may have to be adapted in terms of its size in such a way that it can be accommodated completely within these limits. If necessary, it can be reduced in size, it being necessary for the ratio between the distances between the individual points to remain the same, in order to avoid an unnecessary loss of image information. If the colorimetric values that can be displayed in the perceived color space are all contained in the output color space, the limits of the output color space do not form any physical restriction.

The core idea of the invention is based on the fact that each colorimetric value corresponds to an item of information, the color difference between two image points making some statement about the relationship between the image points. If, then, the colorimetric values of the individual image points from an image are plotted as points in a color space which is not equally spaced in terms of perception, for example an RGB color space, the group of points produced is transferred, geometrically unchanged, into a perceived color space, is then transformed into an output color space and the image points from the image are displayed with the colorimetric values in the output space, the result is an erroneous color display of the original image, in which identical color differences between different image points can also be detected as identical color distances by the eye.

Thus, although the absolute color information from the image is lost, by contrast, colors lying extremely close to one another in the original image are displayed in the erroneous color image in such a way that the color difference lying between them is detectable. As a result, the ability of original images to be evaluated is improved significantly, with a loss in the fidelity of color.

Such a display of image information is therefore precisely suitable in particular when the fidelity of color of the display is not crucial, for example in the case of significant image-providing measurement methods such as, in medical diagnostics, for display X-ray, ultrasound, CT or nuclear magnetic resonance tomography images, in material testing, for displaying radiation, vibration and sound images, and in geography and meteorology, for displaying infrared images and photographs or, in microscopy, for displaying scanning electron images.

In particular, suitable perceived spaces are the color systems known under the names CIE-L*a*b or a CIE-LUV color system. They are recognized as physiologically substantially equal spaced color spaces and are based on empirical trials of the color perception of humans.

The group of points transferred into the perceived space can be manipulated therein, in order to depict a still better representation of the information contained in the measurable color differences. In this case the group of points in the perceived space should be subjected as far as possible to a similarity projection within the limits of the output color space projected into the perceived color space, so that the relationships between the color differences are maintained in relation to one another. However, it may also be advantageous to distort the group of points. For example, by means of distorting the group of points, the image information can be adapted to the visual deficiencies of an observer, for example to red-green blindness.

In a preferred refinement of the method according to the invention, the group of points in the perceived color space is expanded within the limits of the output color space projected into the perceived color space, as far as the limits of the output color space. By means of the expansion, the color difference between the individual colorimetric value points is increased. In the case of neutral original images, an increase by a factor of 3.5 can be achieved in the number of distinguishable gray steps.

In addition, the position and/or the orientation of the group of points in the perceived color space can be changed for the purpose of improved display of the color information.

Finally, in the case of a linear group of points, this can be projected onto another line while maintaining the relative color differences between individual image points. Such a procedure is suitable in particular for the erroneous-color display of a neutral original image. For example, a neutral group of points which extends on the central mid-axis of a CIE L*a*b* color space, can be transferred into a group of points running spirally around the central black/white axis of the color space. In this way, various gray stages are converted into a large number of colors.

BRIEF DESCRIPTION OF THE DRAWINGS

In the following text, the invention will be explained in more detail by using figures, which show an exemplary embodiment of the method.

DETAILED DESCRIPTION OF THE INVENTION

Figure 1A:
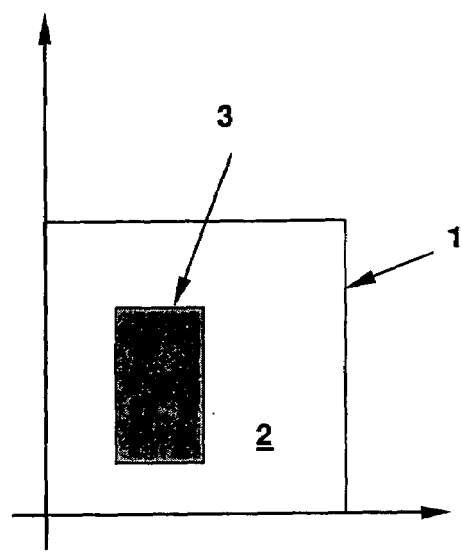
FIGS. 1a–d show a substantially simplified schematic representation of the method sequence in an initial color space and a perceived color space.

Firstly, all the colorimetric values from an original image that can be displayed in an initial color space are plotted as points in the initial color space and form a group of points. The initial color space has the property that the three-dimensional distance between two colors in the initial color space not necessarily correspond to the physiologically perceived color difference. The initial color space may be, for example, an HSI color space or an RGB color space. FIG. 1a displays the envelope 1 of an initial color space 2 in schematic form. Within this color space, a group of points 3 (shown schematically here) is plotted, comprising all the colorimetric values from an original image to be processed which can be displayed in the initial color space.

Figure 1B:
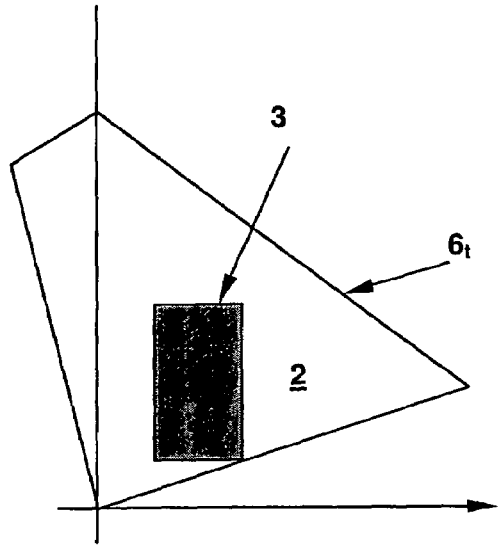

The group of points 3 is transferred, in its geometric form existing in the initial color space 2, into a perceived color space 4, the group of points 3 being arranged within an envelope 6t transformed into the perceived color space 4 and belonging to an output color space 5. FIG. 1b shows the envelope 6t of the output color space 5 transformed into a perceived color space 4. The group of points 3, in its geometry defined in the initial color space 2, is arranged within the transformed envelope 6t in the perceived color space 4.

Figure 1C:
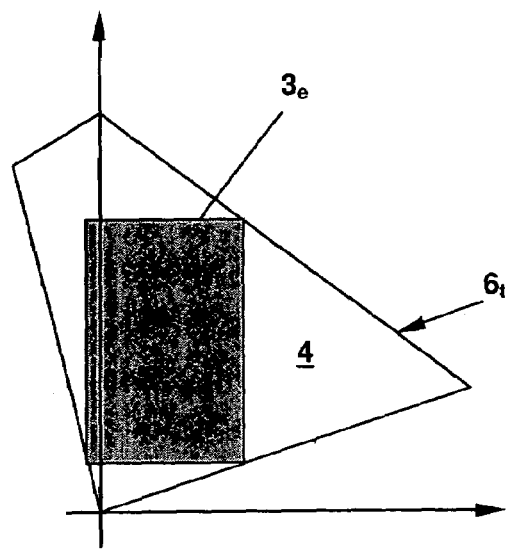

The group of points 3 is expanded in the perceived color space 4 as far as the limits of the transformed envelope 6t of the output color space 5, thereby maintaining the geometrical relation of the distances between the points and thus the symmetry of the group of points 3. In FIG. 1c, the group of points 3e expanded as far as the limits of the transformed envelope 6t is shown.

Figure 1D:
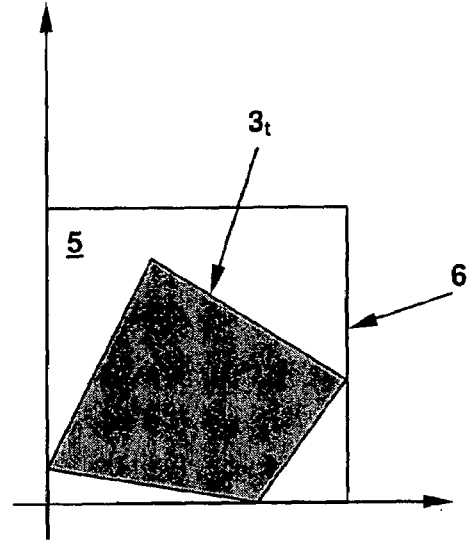

The expanded group of points 3e is transformed into the output color space 5 by using transformation equations existing between the perceived color space 4 and the output color space 5. Accordingly, FIG. 1d shows the transformed group of points 3t in the envelope 6 of the output color space 5. The output color space 5 can in this case be any color space whose colorimetric value parameters can be used for image reproduction.

The output color space 5 could be, for example, an RGB color space for monitor reproduction or a CMYK color space or a Pantone color space for print reproduction. Given suitable reproduction media, however, the perceived color space itself could also be the output color space. In this case, the transformation would consist in a 1:1 transformation and would not have to be carried out. For the purposes of this application, a 1:1 transformation (possibly not carried out) is viewed as a constituent part of the method.

Figure 2:
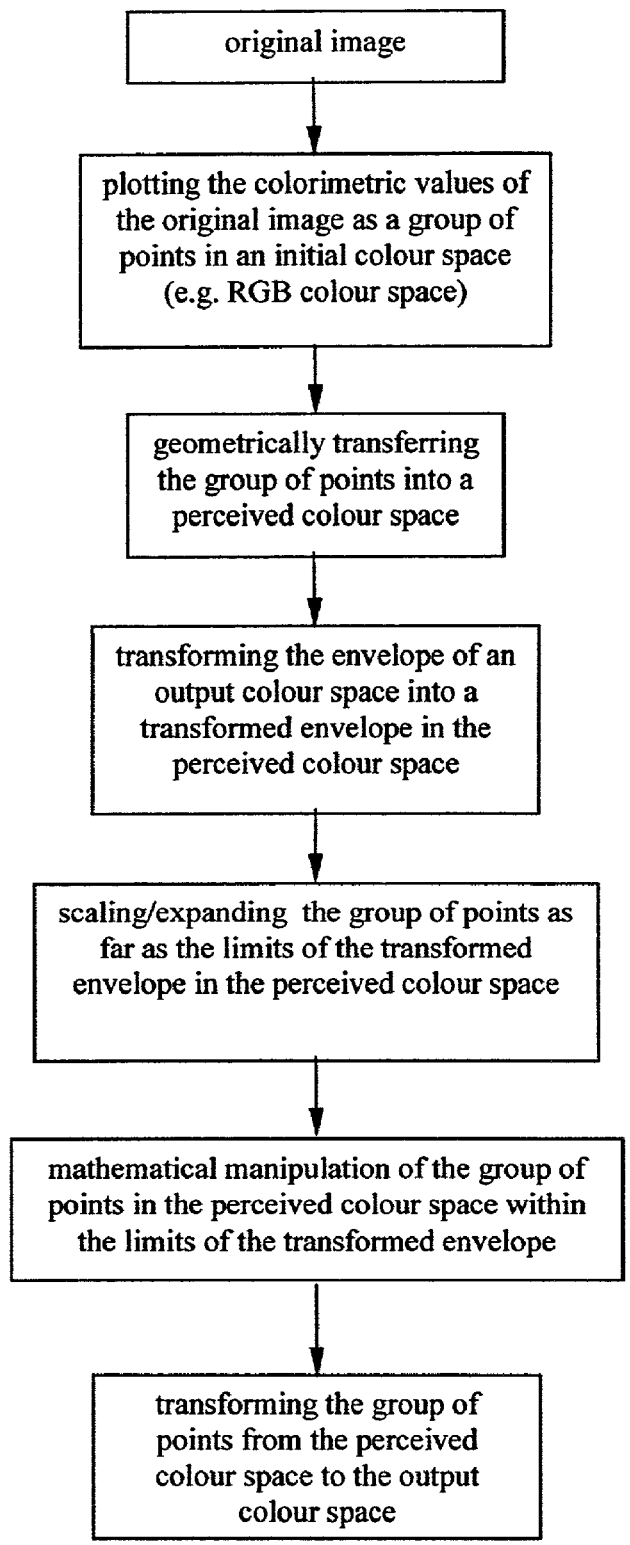
FIG. 2 shows a flow diagram of the method.

FIG. 2 shows a flow diagram of the method according to the invention. Firstly, the colorimetric values of the individual image points from an original image are plotted in an output color space, here an RGB color space with the value ranges $0<=R,G,B<=1$. The individual colorimetric values form a group of points.

In a next step, the group of points—while maintaining its geometry—is transferred into a perceived color space, to be specific within the envelope of an output color space transformed into the perceived color space. Shown here is the conversion of the envelope of the RGB color space (R=0, R=1, G=0, G=1, G=0, B=1) into the CIE Lab perceived color space. The conversion is given by the following transformation equations:

1) $X = 0.490\ R = 0.310\ G + 0.200\ B$

2) $Y = 0.177\ R + 0.812\ G + 0.011\ B$

3) $Z = 0.000\ R + 0.010\ G + 0.990\ B$

4) $L = 88.469444\ \log(12.5\ Y + 1)$

5) $a = 500\ (X^{1/3} - Y^{1/3})$

6) $b = 200\ (Y^{1/3} - Z^{1/3})$

In order that the group of points can be arranged completely within the transformed envelope in the perceived color space, it may have to be rescaled, that is to say reduced in size, while maintaining the symmetry.

The group of points transferred into the perceived color space may be manipulated mathematically within the transformed envelope. For example, it is possible to expand the group of points without changing its geometric shape, for example for the purpose of better utilization of the output color space. The group of points can also be displaced or rotated, for example in order to align it with the black/white axis of the perceived color space. In addition, the colorimetric value can be matched to existing, partial color blindness (red/green or yellow/blue) of the observer by deforming the group of points.

In addition, other conventional image processing methods can be used in the perceived color space, such as histogram equalizations, general gray-value transformations or filter projections, just like known methods for pseudo-coloration or false-color display, edge detection, image sharpening, contrast enhancement, noise suppression, image correction and image enhancement.

Finally, the group of points, possibly mathematically manipulated, is transferred into an output color space by using the transformation equations existing between the spaces. For example, the group of points can be transformed from the CIE Lab color space into the RGB color space by using the following equations:

1) $X = ((a/500) + Y^{1/3})^3$

2) $Y = (10^{(L/88.469444)} - 1)/12.5$

3) $Z = (Y^{1/3} - b/200))^3$

4) $R = 2.365X - 0.897\ Y - 0.468Z$

5) $G = -0.515X + 1.426Y + 0.089Z$

6) $B = 0.005X - 0.014Y + 1.009Z$

Thus, while there have been shown and described features of the present invention as applied to preferred embodiments thereof, it will be understood that various omissions and substitutions and changes in the form and details of the devices illustrated, and in their operation, and in the method illustrated and described, may be made by those skilled in the art without departing from the spirit of the invention as broadly disclosed herein.

What is claimed is:

1. A method of adapting image information to a perceptive capacity of a human eye, having the following steps:

displaying lightness values and colorimetric values or chromaticity steps from an original image as a group of points within an initial color space;

transferring the group of points into a physiologically substantially equal-spaced perceived color space thereby keeping the spatial relationship between corresponding color points of the two color spaces unchanged and maintaining the group of points within the limits of an output color space projected into the perceived color space;

transforming the group of points from the perceived color space into the output color space by using transformation equations existing between the perceived color space and the output color space;

displaying an image with lightness values and colorimetric values or chromaticity steps in accordance with the group of points contained in the output color space.

2. The method according to claim 1, characterized in that the perceived color space is a CIE-L*a*b* or a CIE-LUV color space.

3. The method according to claim 2, characterized in that the group of points in the perceived color space within the limits of the output color space projected into the perceived color space is subjected to a similarity projection.

4. The method according to claim 3, characterized in that the position or the orientation of the group of points in the perceived color space is changed.

5. The method according to claim 4, characterized in that, in the event of a linear group of points, these are projected onto another line while maintaining the relative color distances between individual image points in the perceived color space.

6. The method according to claim 3, characterized in that, in the event of a linear group of points, these are projected onto another line while maintaining the relative color distances between individual image points in the perceived color space.

7. The method according to claim 2, characterized in that, in the event of a linear group of points, these are projected onto another line while maintaining the relative color distances between individual image points in the perceived color space.

8. The method according to claim 2, characterized in that the group of points in the perceived color space is expanded as far as the limits of the output color space projected into the perceived color space.

9. The method according to claim 8, characterized in that the position or the orientation of the group of points in the perceived color space is changed.

10. The method according to claim 9, characterized in that, in the event of a linear group of points, these are projected onto another line while maintaining the relative color distances between individual image points in the perceived color space.

11. The method according to claim 8, characterized in that, in the event of a linear group of points, these are projected onto another line while maintaining the relative color distances between individual image points in the perceived color space.

12. The method according to claim 1, characterized in that the group of points in the perceived color space within the limits of the output color space projected into the perceived color space is subjected to a similarity projection.

13. The method according to claim 12, characterized in that the position or the orientation of the group of points in the perceived color space is changed.

14. The method according to claim 13, characterized in that, in the event of a linear group of points, these are projected onto another line while maintaining the relative color distances between individual image points in the perceived color space.

15. The method according to claim 12, characterized in that, in the event of a linear group of points, these are projected onto another line while maintaining the relative color distances between individual image points in the perceived color space.

16. The method according to claim 1, characterized in that the group of points in the perceived color space is expanded as far as the limits of the output color space projected into the perceived color space.

17. The method according to claim 16, characterized in that the position or the orientation of the group of points in the perceived color space is changed.

18. The method according to claim 17, characterized in that, in the event of a linear group of points, these are projected onto another line while maintaining the relative color distances between individual image points in the perceived color space.

19. The method according to claim 16, characterized in that, in the event of a linear group of points, these are projected onto another line while maintaining the relative color distances between individual image points in the perceived color space.

20. The method according to claim 1, characterized in that, in the event of a linear group of points, these are projected onto another line while maintaining the relative color distances between individual image points in the perceived color space.

* * * * *